US009132401B2

(12) United States Patent
Ariyapadi et al.

(10) Patent No.: US 9,132,401 B2
(45) Date of Patent: Sep. 15, 2015

(54) SYSTEMS AND METHODS FOR PRODUCING SUBSTITUTE NATURAL GAS

(71) Applicant: Kellogg Brown & Root LLC, Houston, TX (US)

(72) Inventors: Siva Ariyapadi, Pearland, TX (US); Phillip Shires, Katy, TX (US)

(73) Assignee: KELLOG BROWN & ROOT LLC, Houston, TX (US)

( * ) Notice: Subject to any disclaimer, the term of this patent is extended or adjusted under 35 U.S.C. 154(b) by 0 days.

(21) Appl. No.: 13/663,708

(22) Filed: Oct. 30, 2012

(65) Prior Publication Data

US 2014/0117287 A1    May 1, 2014
US 2015/0034876 A9    Feb. 5, 2015

Related U.S. Application Data

(63) Continuation-in-part of application No. 13/091,980, filed on Apr. 21, 2011, now Pat. No. 8,382,867, which is a continuation of application No. 12/437,999, filed on May 8, 2009, now Pat. No. 7,955,403.

(60) Provisional application No. 61/081,304, filed on Jul. 16, 2008.

(51) Int. Cl.
     *C01B 3/24*          (2006.01)
     *B01J 7/00*          (2006.01)
     (Continued)

(52) U.S. Cl.
CPC ... *B01J 7/00* (2013.01); *C01B 3/02* (2013.01); *C01B 3/16* (2013.01); *C10J 3/56* (2013.01); *C10K 1/004* (2013.01); *C10K 1/005* (2013.01); *C10K 1/007* (2013.01); *C10K 1/024* (2013.01); *C10K 1/101* (2013.01); *C10K 3/04* (2013.01); *C01B 2203/0233* (2013.01); *C01B 2203/0294* (2013.01); *C01B 2203/0415* (2013.01); *C01B 2203/0445* (2013.01); *C01B 2203/0465* (2013.01); *C01B 2203/0475* (2013.01);
(Continued)

(58) Field of Classification Search
CPC ................................................. C01B 2203/0233
USPC ........................................................ 423/650
See application file for complete search history.

(56) References Cited

U.S. PATENT DOCUMENTS 3,642,460 A * 2/1972 Thompson ..................... 518/704
3,788,281 A * 1/1974 Van Lookeren Campagne .................... 122/7 R
(Continued)

OTHER PUBLICATIONS

Agarwal, A.T., "Improving Rotary Valve Performance," Chemical Eng., Mar. 2005, p. 29-33.
(Continued)

*Primary Examiner* — Paul Wartalowicz
(74) *Attorney, Agent, or Firm* — Gary M Machetta

(57) ABSTRACT

Systems and methods for producing synthetic gas are provided. The method can include gasifying a carbonaceous feedstock in the presence of an oxidant within a gasifier to provide a raw syngas. The raw syngas can be cooled within a cooler to provide a cooled syngas. The cooled syngas can be processed within a purification system to provide a treated syngas. The purification system can include a saturator adapted to increase a moisture content of the cooled syngas. The treated syngas and a first heat transfer medium can be introduced to a methanator to provide a synthetic gas, a second heat transfer medium, and a methanation condensate. At least a portion of the methanation condensate can be recycled from the methanator to the saturator.

19 Claims, 4 Drawing Sheets

(51) Int. Cl.
*C01B 3/02* (2006.01)
*C01B 3/16* (2006.01)
*C10J 3/56* (2006.01)
*C10K 1/00* (2006.01)
*C10K 1/02* (2006.01)
*C10K 1/10* (2006.01)
*C10K 3/04* (2006.01)

(52) U.S. Cl.
CPC . *C01B2203/0485* (2013.01); *C01B 2203/0894* (2013.01); *C01B 2203/86* (2013.01); *C10J 2300/093* (2013.01); *C10J 2300/1662* (2013.01); *C10J 2300/1675* (2013.01); *C10J 2300/1678* (2013.01); *C10J 2300/1884* (2013.01); *C10J 2300/1892* (2013.01)

(56) References Cited

U.S. PATENT DOCUMENTS

| | | | |
|---|---|---|---|
| 3,854,895 A | 12/1974 | Muller | |
| 3,898,057 A | 8/1975 | Moller et al. | |
| 3,904,389 A | 9/1975 | Banquy | |
| 3,922,148 A * | 11/1975 | Child | 48/197 R |
| 3,927,998 A | 12/1975 | Child et al. | |
| 3,928,001 A | 12/1975 | Child et al. | |
| 3,929,429 A * | 12/1975 | Crouch | 48/201 |
| 3,938,968 A | 2/1976 | White et al. | |
| 3,966,633 A | 6/1976 | Friedman | |
| 3,971,635 A * | 7/1976 | Matthews | 48/202 |
| 4,010,008 A | 3/1977 | Jo | |
| 4,028,067 A | 6/1977 | Gent | |
| 4,080,424 A | 3/1978 | Miller et al. | |
| 4,124,487 A | 11/1978 | Tsybulevsky et al. | |
| 4,133,825 A | 1/1979 | Stroud et al. | |
| 4,209,305 A | 6/1980 | Conway et al. | |
| 4,230,556 A | 10/1980 | Carr et al. | |
| 4,244,706 A | 1/1981 | Forney et al. | |
| 4,254,094 A | 3/1981 | Hegarty | |
| 4,260,553 A * | 4/1981 | Happel et al. | 518/714 |
| 4,325,709 A | 4/1982 | Gohler et al. | |
| 4,391,611 A | 7/1983 | Haldipur et al. | |
| 4,493,636 A | 1/1985 | Haldipur et al. | |
| 4,588,418 A | 5/1986 | Gabler et al. | |
| 4,619,679 A | 10/1986 | DeLong | |
| 4,704,137 A * | 11/1987 | Richter | 48/197 R |
| 5,361,513 A | 11/1994 | Woessner | |
| 5,392,594 A | 2/1995 | Moore et al. | |
| 5,447,702 A | 9/1995 | Campbell et al. | |
| 5,560,900 A | 10/1996 | Gbordzoe et al. | |
| 5,578,093 A | 11/1996 | Campbell et al. | |
| 5,655,466 A | 8/1997 | Hulkkonen et al. | |
| 5,685,138 A | 11/1997 | Rao et al. | |
| 5,953,899 A | 9/1999 | Rao et al. | |
| 6,034,031 A | 3/2000 | Sata | |
| 6,054,043 A | 4/2000 | Simpson | |
| 6,676,716 B2 | 1/2004 | Fujimora et al. | |
| 6,802,178 B2 | 10/2004 | Sprouse et al. | |
| 6,966,190 B2 | 11/2005 | Wylie | |
| 2002/0004533 A1* | 1/2002 | Wallace et al. | 518/712 |
| 2002/0103405 A1 | 8/2002 | Hatanaka | |
| 2002/0103407 A1 | 8/2002 | Hatanaka | |
| 2003/0131582 A1 | 7/2003 | Anderson et al. | |
| 2004/0221583 A1 | 11/2004 | Wylie | |
| 2006/0096298 A1 | 5/2006 | Barnicki et al. | |
| 2006/0101715 A1 | 5/2006 | Vlok et al. | |
| 2006/0130719 A1 | 6/2006 | Morin et al. | |
| 2006/0149423 A1 | 7/2006 | Barnicki et al. | |
| 2007/0175618 A1* | 8/2007 | Key et al. | 165/157 |
| 2008/0081844 A1 | 4/2008 | Shires et al. | |
| 2009/0019767 A1 | 1/2009 | Abughazaleh et al. | |

OTHER PUBLICATIONS

Barker, et al., "Pressure feeder for powered coal or other finely divided solids," I&EC, 43(5), p. 1204-1209, May 1951.

Alessi, P., et al., "Particle production of steroid drugs using supercritical fluid processing," I&EC Res., 35(12), p. 4718-4726, 1996.

Campbell, William M., et al. "Transport Gasifier," U.S. Appl. No. 08/090,804, Jan. 2005.

"Coal: America's Energy Future, vol. II: A Technical Overview" Report of the National Coal Council, Mar. 2006.

Cover, A.E. et al., Advanced Coal Gasification Technical Analyses—Appendix 3—Technical/Economic Evaluations, Gas Research Institute, Dec. 1982-1985.

Holt, Neville, "Gasification Process Selection—Trade-offs and Ironies," Electronic Power Research Institute Gasification Technologies Conference, Washington DC, Oct. 3-6, 2004.

Holt, Neville, "Gasification Process Selection—Trade-offs and Ironies," Presentation/slideshow, Electronic Power Research Institute Gasification Technologies Conference, Washington DC, Oct. 4-6, 2004.

Maurstad, Ola. "An Overview of Coal based Integrated Gasification Combined Cycle (IGCC) Technology," Massachusetts Institute of Technology—Laboratory for Energy and the Environment, Sep. 2005, MIT LFEE 2005-002 WP, pp. 1-36.

"PERP Report," Coal Gasification Technologies 03/04S11, Nexant Chem Systems, Jan. 2005, pp. 1-46.

Ruby, John et al., Substitute Natural Gas from Coal Co-Production Project—A Status Report, 23rd Annual International Pittsburg Coal Conference, Sep. 25, 2006-Sep. 28, 2006, pp. 1-16, Pittsburg, Pennsylvania.

* cited by examiner

SYSTEMS AND METHODS FOR PRODUCING SUBSTITUTE NATURAL GAS

CROSS-REFERENCE TO RELATED APPLICATIONS

This application is a continuation-in-part of U.S. patent application Ser. No. 13/091,980, filed on Apr. 21, 2011, and published as U.S. Publication No. 2012/0101323, which is a continuation of U.S. patent application Ser. No. 12/437,999, filed on May 8, 2009, and issued as U.S. Pat. No. 7,955,403, which claims priority to U.S. Provisional Patent Application having Ser. No. 61/081,304, filed on Jul. 16, 2008, all of which are incorporated by reference herein.

BACKGROUND

1. Field

Embodiments described herein generally relate to systems and methods for producing synthetic gas. More particularly, such embodiments relate to systems and methods for producing synthetic gas using low grade coal or other carbonaceous feedstocks.

2. Description of the Related Art

Clean coal technology using gasification is a promising alternative to meet the global energy demand. Most existing coal gasification processes perform best on high rank (bituminous) coals and petroleum refinery waste products, but these processes are inefficient, unreliable, and expensive to operate when processing low grade coal. Low grade coal reserves including low rank and high ash coal remain underutilized as energy sources despite being available in abundance. Coal gasification coupled with methanation and carbon dioxide management offer an environmentally sound energy source. Synthetic or substitute natural gas ("SNG") can provide a reliable supply of fuel. SNG, with the right equipment, can be produced proximate to a coal source. SNG can be transported from a production location into an already existing natural gas pipeline infrastructure, which makes the production of SNG economical in areas where it would otherwise be too expensive to mine and transport low grade coal.

Typical problems with SNG production include high auxiliary power and process water requirements. The large quantities of power and water needed to run the SNG production system can greatly escalate the cost of production and limit where SNG generation systems can be deployed.

There is a need, therefore, for more efficient systems and methods for producing SNG from coal that reduce the requirements for outside power and water.

DETAILED DESCRIPTION loom Systems and methods for producing synthetic gas are provided. The method can include gasifying a carbonaceous feedstock in the presence of an oxidant within a gasifier to provide a raw syngas. The raw syngas can be cooled within a cooler to provide a cooled syngas. The cooled syngas can be processed within a purification system to provide a treated syngas. The purification system can include a saturator adapted to increase a moisture content of the cooled syngas. The treated syngas and a first heat transfer medium can be introduced to a methanator to provide a synthetic gas, a second heat transfer medium, and a methanation condensate. At least a portion of the methanation condensate can be recycled from the methanator to the saturator.

Figure 1:
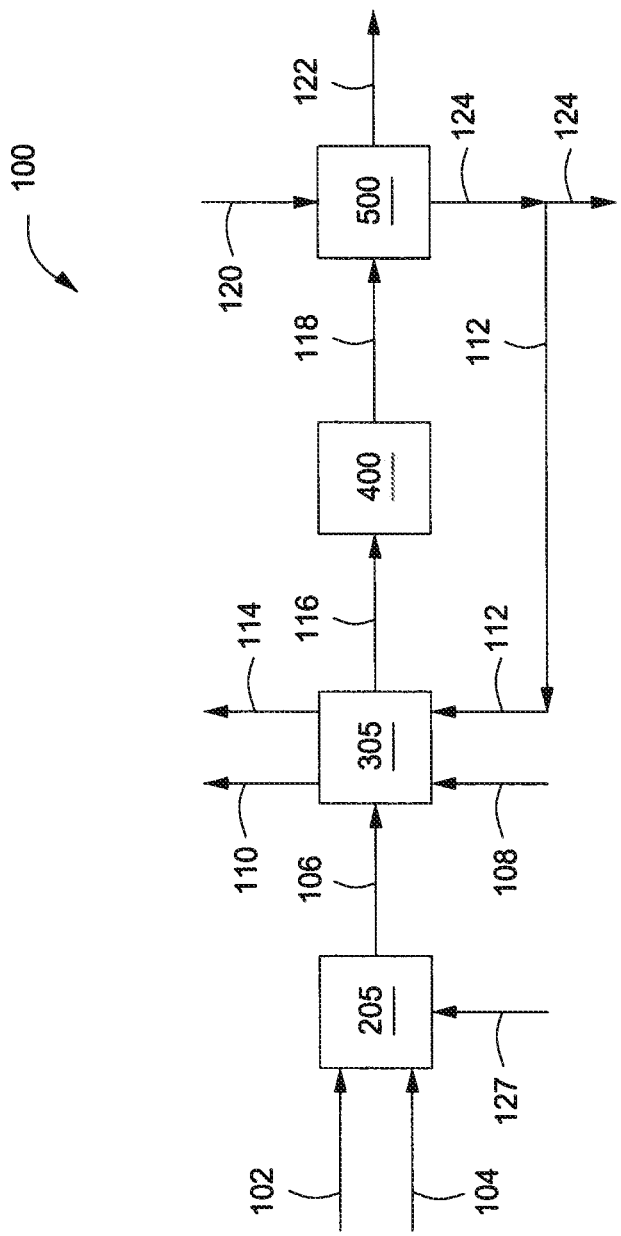
FIG. 1 depicts a schematic of an illustrative SNG system, according to one or more embodiments described.

FIG. 1 depicts an illustrative synthetic gas or substitute natural gas ("SNG") system 100 according to one or more embodiments. The SNG system 100 can include one or more gasifiers 205, one or more syngas coolers 305, one or more synthetic gas or "syngas" purification systems 400, and one or more methanators or methanation systems 500. A carbonaceous feedstock via line 102, an oxidant via line 104, and steam via line 127 can be introduced to the gasifier 205, and the gasifier 205 can gasify the feedstock in the presence of the oxidant and the steam to provide a raw syngas via line 106. The raw syngas via line 106 can exit the gasifier 205 at a temperature ranging from about 575° C. to about 2,100° C. For example, the raw syngas in line 106 can have a temperature ranging from a low of about 800° C., about 900° C., about 1,000° C., or about 1,050° C. to a high of about 1,150° C., about 1,250° C., about 1,350° C., or about 1,450° C.

The raw syngas via line 106 can be introduced to the syngas cooler 305 to provide a cooled syngas via line 116. Heat from the raw syngas introduced via line 106 to the syngas cooler 305 can be transferred to a heat transfer medium introduced via line 108 and/or 112. The heat transfer medium in line 108 and/or 112 can be process water, boiler feed water, superheated low pressure steam, superheated medium pressure steam, superheated high pressure steam, saturated low pressure steam, saturated medium pressure steam, saturated high pressure steam, and the like. Although not shown, the heat transfer medium in line 108 and/or 112 can include process steam or condensate from the syngas purification system 400.

Although not shown, the heat transfer medium via line 112 can be introduced or otherwise mixed with the heat transfer medium in line 108 to provide a heat transfer medium mixture or "mixture." The mixture can be introduced as the heat transfer medium to the syngas cooler 305 to provide the superheated high pressure steam via line 110 and/or line 114. The mixture can also be recovered from the syngas cooler 305 via a single line (not shown).

The heat transfer medium in line 108, for example boiler feed water, can be heated within the syngas cooler 305 to provide superheated high pressure steam via line 110. The heat transfer medium in line 112 can be heated within the syngas cooler 305 to provide superheated high pressure steam or steam at a higher temperature and/or pressure than in line 112 via line 114. The steam via line 110 and/or line 114 can have a temperature of about 450° C. or more, about 550° C. or more, about 650° C. or more, or about 750° C. or more. The steam via line 110 and/or line 114 can have a pressure of about 4,000 kPa or more, about 8,000 kPa or more, about 11,000 kPa or more, about 15,000 kPa or more, about 17,000 kPa or more, about 19,000 kPa or more, about 21,000 kPa or more, or about 22,100 kPa or more.

At least a portion of the superheated high pressure steam via lines 110, 114 can be used to generate auxiliary power for the SNG system 100. At least a portion of the superheated high pressure steam via lines 110, 114 can be introduced to the gasifier 205. For example, the superheated high pressure steam via lines 110, 114 can be introduced to the gasifier 205 after a pressure let down, for example from a steam turbine.

The cooled syngas via line 116 from the syngas cooler 305 can be introduced to the purification system 400 to provide a treated/purified syngas via line 118. The syngas purification system 400 can remove particulates, ammonia, carbonyl sulfide, chlorides, mercury, and/or acid gases. The syngas purification system 400 can saturate the cooled syngas with water, shift convert carbon monoxide to carbon dioxide, or combinations thereof.

The syngas in line 118 can have a hydrogen concentration ranging from a low of about 20 mol %, about 30 mol %, about 40 mol %, or about 50 mol % to a high of about 60 mol %, about 70 mol %, about 80 mol %, or about 90 mol %, on a dry basis. For example, the syngas in line 118 can have a hydrogen concentration of about 25 mol % to about 85 mol %, about 35 mol % to about 75 mol %, about 45 mol % to about 65 mol %, or about 60 mol % to about 70 mol %, on a dry basis. The syngas in line 118 can have a carbon monoxide concentration ranging from a low of about 1 mol %, about 5 mol %, about 10 mol %, or about 15 mol % to a high of about 25 mol %, about 30 mol %, about 35 mol %, or about 40 mol %, on a dry basis. For example, the syngas in line 118 can have a carbon monoxide concentration of about 3 mol % to about 37 mol %, about 7 mol % to about 33 mol %, about 13 mol % to about 27 mol %, or about 17 mol % to about 23 mol %, on a dry basis. The syngas in line 118 can have a carbon dioxide concentration ranging from a low of about 0 mol %, about 5 mol %, about 10 mol %, or about 15 mol % to a high of about 20 mol %, about 25 mol %, or about 30 mol %, on a dry basis. For example, the syngas in line 118 can have a carbon dioxide concentration of about 0.1 mol % to about 30 mol %, about 0.5 mol % to about 20 mol %, about 1 mol % to about 15 mol %, or about 2 mol % to about 10 mol %, on a dry basis. The syngas in line 118 can have a methane concentration ranging from a low about 0 mol %, about 3 mol %, about 5 mol %, about 7 mol %, or about 9 mol % to a high of about 15 mol %, about 20 mol %, about 25 mol %, or about 30 mol %, on a dry basis. For example, the syngas in line 118 can have a methane concentration of about 2 mol % to about 19 mol %, about 4 mol % to about 17 mol %, about 6 mol % to about 15 mol %, or about 8 mol % to about 13 mol %, on a dry basis. The syngas in line 118 can have a nitrogen concentration of about 5 mol % or less, about 4 mol % or less, about 3 mol % or less, about 2 mol % or less, about 1 mol % or less, or about 0.5 mol % or less, on a dry basis. For example, the syngas in line 118 can have a nitrogen concentration of about 0.01 mol % to about 4.5 mol %, about 0.05 mol % to about 3.5 mol %, about 0.07 mol % to about 2.5 mol %, or about 0.1 mol % to about 1.5 mol %, on a dry basis. The syngas in line 118 can have an argon concentration of about 5 mol % or less, about 4 mol % or less, about 3 mol % or less, about 2 mol % or less, about 1 mol % or less, or about 0.5 mol % or less, on a dry basis. For example, the syngas in line 118 can have an argon concentration of about 0.01 mol % to about 3.5 mol %, about 0.02 mol % to about 2.5 mol %, or about 0.03 mol % to about 1.5 mol %, on a dry basis. The syngas in line 118 can have a water concentration of about 5 mol % or less, about 4 mol % or less, about 3 mol % or less, about 2 mol % or less, about 1 mol % or less, or about 0.5 mol % or less, on a wet basis. For example, the syngas in line 118 can have a water concentration of about 0.01 mol % to about 3.5 mol %, about 0.05 mol % to about 2.5 mol %, or about 0.1 mol % to about 1.5 mol %, on a wet basis.

The low concentration of inert gases, i.e., nitrogen and argon, can increase the heating value of the SNG provided via line 122 from the methanator 500. A higher methane concentration in the treated syngas via line 118 can be beneficial for SNG production, can provide a product value, for example a heating value, and can also reduce the product gas recycle requirements to quench the heat of reaction within the methanator 500. The methane concentration can also reduce auxiliary power consumption, capital costs, and operating costs of the SNG system.

The treated syngas via line 118 and a heat transfer medium ("first heat transfer medium") via line 120 can be introduced to the methanator 500 to provide a methanated syngas or SNG via line 122 and a heated heat transfer medium ("second heat transfer medium"), e.g., steam, via line 124. The methanator 500 can be or include any device or system suitable for converting at least a portion of the hydrogen, carbon monoxide, and/or carbon dioxide to SNG. The SNG in line 122 can have a methane content ranging from a low of about 0.01 mol % to a high of 100 mol %. For example, the SNG in line 122 can have a methane content ranging from a low of about 65 mol %, about 75 mol %, or about 85 mol % to a high of about 90 mol %, about 95 mol %, or about 100 mol %. The methanator 500 can be operated at a temperature ranging from a low of about 150° C., about 425° C., about 450° C., or about 475° C. to a high of about 535° C., about 565° C., or about 590° C. The methanator 500 can also be operated at a temperature ranging from a low of about 590° C., about 620° C., or about 640° C. to a high of about 660° C., about 675° C., about 700° C., or about 1,000° C.

The methanation of the treated syngas in line 118 is an exothermic reaction that generates heat. At least a portion of the heat generated during methanation of the purified syngas can be transferred to the heat transfer medium introduced via line 120 to provide the steam via line 124. The heat transfer medium in line 120 can be process water, boiler feed water, and the like. For example, boiler feed water introduced via line 120 to the methanator 500 can be heated to provide low pressure steam, medium pressure steam, high pressure steam, saturated low pressure steam, saturated medium pressure steam, or saturated high pressure steam. At least a portion of the steam ("second heat transfer medium") in line 124 can be introduced to the syngas cooler 305 as the heat transfer medium introduced via line 112. Another portion of the steam via line 124 can be provided to various process units within SNG generation system 100 (not shown). The steam in line 124 can have a temperature of about 250° C. or more, about 350° C. or more, about 450° C. or more, about 550° C. or more, about 650° C. or more, or about 750° C. or more. The steam in line 124 can be at a pressure of about 4,000 kPa or more, about 7,500 kPa or more, about 9,500 kPa or more, about 11,500 kPa or more, about 14,000 kPa or more, about 16,500 kPa or more, about 18,500 kPa or more, about 20,000 kPa or more, about 21,000 kPa or more, or about 22,100 kPa or more. For example, the steam in line 124 can be at a pressure of from about 4,000 kPa to about 14,000 kPa or from about 7,000 kPa to about 10,000 kPa. As described above, the steam ("second heat transfer medium") via line 112 can absorb heat from the raw syngas via line 106 in the syngas cooler 305 to provide the steam ("third heat transfer medium") via line 110 and/or 114.

Figure 2:
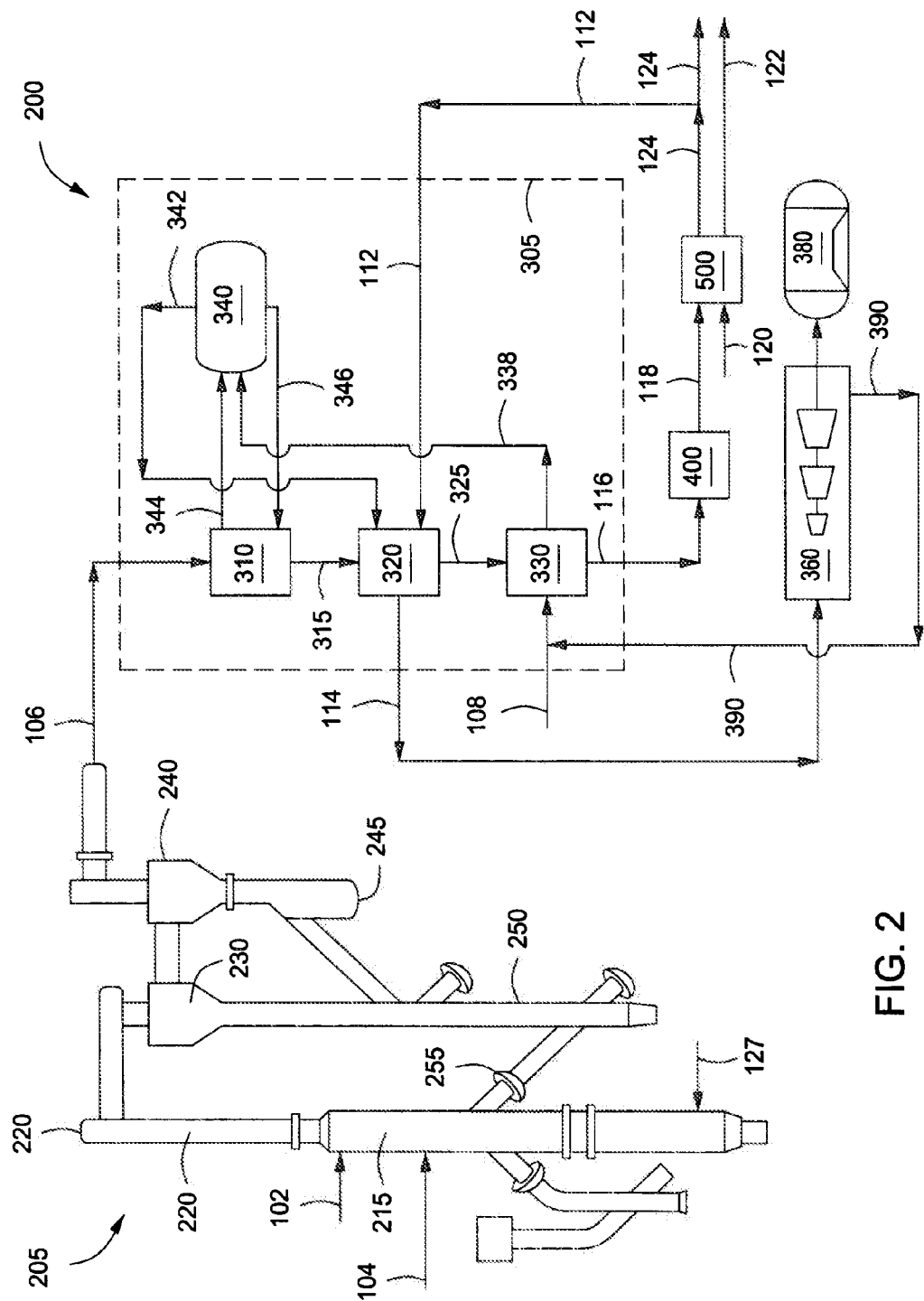
FIG. 2 depicts a schematic of another illustrative SNG system, according to one or more embodiments described.

FIG. 2 depicts a schematic of another illustrative SNG system 200 according to one or more embodiments. The SNG system 200 can include, but is not limited to, one or more gasifiers 205, one or more syngas coolers 305, one or more purification systems 400, and one or more methanators 500. The gasifier 205 can include one or more mixing zones 215, risers 220, and disengagers 230, 240.

The feedstock via line 102, oxidant via line 104, and steam via line 127 can be combined in the mixing zone 215 to provide a gas mixture. The feedstock via line 102 can include any suitable carbonaceous material. The carbonaceous material can include, but is not limited to, one or more carbon-containing materials whether solid, liquid, gas, or a combination thereof. The one or more carbon-containing materials can include, but are not limited to, coal, coke, petroleum coke, cracked residue, crude oil, whole crude oil, vacuum gas oil, heavy gas oil, residuum, atmospheric tower bottoms, vacuum tower bottoms, distillates, paraffins, aromatic rich material from solvent deasphalting units, aromatic hydrocarbons, asphaltenes, naphthenes, oil shales, oil sands, tars, bitumens, kerogen, waste oils, biomass (e.g., plant and/or animal matter or plant and/or animal derived matter), tar, low ash or no ash polymers, hydrocarbon-based polymeric materials, heavy hydrocarbon sludge and bottoms products from petroleum refineries and petrochemical plants such as hydrocarbon waxes, byproducts derived from manufacturing operations, discarded consumer products, such as carpet and/or plastic automotive parts/components including bumpers and dashboards, recycled plastics such as polypropylene, polyethylene, polystyrene, polyurethane, derivatives thereof, blends thereof, or any combination thereof. Accordingly, the process can be useful for accommodating mandates for proper disposal of previously manufactured materials.

The coal can include, but is not limited to, high-sodium and/or low-sodium lignite, subbituminous, bituminous, anthracite, or any combination thereof. The hydrocarbon-based polymeric materials can include, for example, thermoplastics, elastomers, rubbers, including polypropylenes, polyethylenes, polystyrenes, including other polyolefins, polyurethane, homo polymers, copolymers, block copolymers, and blends thereof; polyethylene terephthalate (PET), poly blends, other polyolefins, poly-hydrocarbons containing oxygen, derivatives thereof, blends thereof, and combinations thereof.

Depending on the moisture concentration of the carbonaceous material, for example coal, the carbonaceous material can be dried prior to introduction to the gasifier 205. The carbonaceous material can be pulverized by milling units, such as one or more bowl mills, and heated to provide a carbonaceous material containing a reduced amount of moisture. For example, the carbonaceous material can be dried to provide a carbonaceous material containing less than about 50% moisture, less than about 30% moisture, less than about 20% moisture, less than about 15% moisture, or less. The carbonaceous material can be dried directly in the presence of a gas, for example nitrogen, or indirectly using any heat transfer medium via coils, plates, or other heat transfer equipment.

The feedstock introduced via line 102 can include nitrogen containing compounds. For example, the feedstock via line 102 can be coal or petroleum coke that contains about 0.5 mol %, about 1 mol %, about 1.5 mol %, about 2 mol % or more nitrogen in the feedstock based on ultimate analysis of the carbonaceous feedstock. At least a portion of the nitrogen contained in the feedstock introduced via line 102 can be converted to ammonia within the gasifier 205. In one or more embodiments, about 10%, about 20%, about 30%, about 40%, about 50%, about 60%, about 70%, about 80% or more of the nitrogen in the feedstock can be converted to ammonia within the gasifier 205. For example, the amount of nitrogen in the feedstock converted within the gasifier 205 to ammonia can range from a low of about 20%, about 25%, about 30%, or about 35% to a high of about 70%, about 80%, about 90%, or about 100%.

The average particle diameter size of the feedstock via line 102 can be used as a control variable to optimize particulate density of the solids recycled to the mixing zone via the standpipe 250. The particle size of the feedstock introduced via line 102 can be varied to optimize the particulate mass circulation rate and to improve the flow characteristics of the gas-solid mixture within the mixing zone 215 and riser 220. The steam via line 127 can be supplied to the gasifier 205 both as a reactant and as a moderator to control the reaction temperature.

The oxidant introduced via line 104 can include, but is not limited to, air, oxygen, essentially oxygen, oxygen-enriched air, mixtures of oxygen and air, mixtures of oxygen and inert gas such as nitrogen and argon, and combinations thereof. As used herein, the term "essentially oxygen" refers to an oxygen feed containing 51% vol oxygen or more. As used herein, the term "oxygen-enriched air" refers to air containing greater than 21% vol oxygen. Oxygen-enriched air can be obtained, for example, from cryogenic distillation of air, pressure swing adsorption, membrane separation, or any combination thereof. The oxidant introduced via line 104 can be nitrogen-free or essentially nitrogen-free. By "essentially nitrogen-free," it is meant that the oxidant in line 104 contains less than about 5% vol nitrogen, less than about 4% vol nitrogen, less than about 3% vol nitrogen, less than about 2% vol nitrogen, or less than about 1% vol nitrogen. The steam via line 127 can be any suitable type of steam, for example low pressure steam, medium pressure steam, high pressure steam, superheated low pressure steam, superheated medium pressure steam, or superheated high pressure steam.

The amount of oxidant introduced via line 104 to the mixing zone 215 can range from about 1% to about 90% of the stoichiometric oxygen required to oxidize the total amount of carbonaceous materials in the carbonaceous solids and/or the carbonaceous containing solids. The oxygen concentration within the gasifier 205 can range from a low of about 1%, about 3%, about 5%, or about 7% to a high of about 30%, about 40%, about 50%, or about 60% of the stoichiometric requirements based on the molar concentration of carbon in the gasifier 205. In one or more embodiments, the oxygen concentration within the gasifier 205 can range from a low of about 0.5%, about 2%, about 6%, or about 10% to a high of about 60%, about 70%, about 80%, or about 90% of the stoichiometric requirements based on the molar concentration of carbon in the gasifier 205.

One or more sorbents can also be introduced to the gasifier 205. The sorbents can capture contaminants from the syngas, such as sodium vapor in the gas phase within the gasifier 205. The sorbents can scavenge oxygen at a rate and level sufficient to delay or prevent oxygen from reaching a concentration that can result in undesirable side reactions with hydrogen (e.g., water) from the feedstock within the gasifier 205. The sorbents can be mixed or otherwise added to the one or more feedstocks. The sorbents can be used to dust or coat feedstock particles in the gasifier 205 to reduce the tendency for the particles to agglomerate. The sorbents can be ground to an average particle size of about 5 microns to about 100 microns, or about 10 microns to about 75 microns. Illustrative sorbents can include, but are not limited to, carbon rich ash, limestone, dolomite, kaolin, silica flour, and coke breeze. Residual sulfur released from the feedstock can be captured by native calcium in the feedstock or by a calcium-based sorbent to form calcium sulfide.

The gasifier 205 can be operated at a temperature range from a low of about 500° C., about 600° C., about 700° C., about 800° C., or about 900° C. to a high of about 1,000° C., about 1,100° C., about 1,200° C., about 1,500° C., or about 2,000° C. For example, the gasifier 205 can be have a temperature between about 870° C. to about 1,100° C., about 890° C. to about 940° C., or about 880° C. to about 1,050° C. Heat can be supplied by burning the carbon in the recirculated solids in a lower portion of the mixing zone 215 before the recirculated solids contact the entering feedstock.

The operating temperature of the gasifier 205 can be controlled, at least in part, by the recirculation rate and/or residence time of the solids within the riser 220; by reducing the temperature of the ash prior to recycling via line 255 to the mixing zone 215; by the addition of steam to the mixing zone 215; and/or by varying the amount of oxidant added to the mixing zone 215. The recirculating solids introduced via line 255 can serve to heat the incoming feedstock, which also can mitigate tar formation.

The residence time and temperature in the mixing zone 215 and the riser 220 can be sufficient for water-gas shift reaction to reach near-equilibrium conditions and to allow sufficient time for tar cracking. The residence time of the feedstock in the mixing zone 215 and riser 220 can be greater than about 2 seconds, greater than about 5 seconds, or greater than about 10 seconds.

The feedstock via line 102, oxidant via line 104, and steam via line 127 can be introduced sequentially or simultaneously into the mixing zone 215. The feedstock via line 102, oxidant via line 104, and steam via line 127 can be introduced separately into the mixing zone 215 (as shown) or mixed prior to introduction to the mixing zone 215 (not shown). The feedstock via line 102, oxidant via line 104, and steam via line 127 can be introduced continuously or intermittently depending on desired product types and grades of the raw syngas.

The mixing zone 215 can be operated at pressures from about 100 kPa to about 6,000 kPa to increase thermal output per unit reactor cross-sectional area and to enhance raw syngas energy output. For example, the mixing zone 215 can be operated at a pressure ranging from a low of about 600 kPa, about 650 kPa, or about 700 kPa to a high of about 2,250 kPa, about 3,250 kPa, or about 3,950 kPa or more. The mixing zone 215 can be operated at a temperature ranging from a low of about 250° C., about 400° C., or about 500° C. to a high of about 650° C., about 800° C., or about 1,000° C. For example, the mixing zone 215 can be operated at a temperature of from about 350° C. to about 950° C., about 475° C. to about 900° C., about 899° C. to about 927° C., or about 650° C. to about 875° C.

The gas mixture can flow through the mixing zone 215 into the riser 220 where additional residence time allows the gasification, steam/methane reforming, tar cracking, and/or water-gas shift reactions to occur. The riser 220 can operate at a higher temperature than the mixing zone 215. Suitable temperatures in the riser 220 can range from about 550° C. to about 2,100° C. For example, suitable temperatures within the riser 220 can range from a low of about 700° C., about 800° C., or about 900° C. to a high of about 1050° C., about 1150° C., about 1250° C., or more. The riser 220 can have a smaller diameter or cross-sectional area than the mixing zone 215, or the riser 220 can have the same diameter or cross-sectional area as the mixing zone 215. The superficial gas velocity in the riser 220 can range from about 3 m/s to about 27 m/s, about 6 m/s to about 24 m/s, about 9 m/s to about 21 m/s, about 9 m/s to about 12 m/s, or about 11 m/s to about 18 m/s.

The gas mixture can exit the riser 220 and enter the disengagers 230, 240 where at least a portion of particulates can be separated from the gas and recycled back to the mixing zone 215 via one or more conduits including, but not limited to, a standpipe 250, and/or j-leg 255. The disengagers 230, 240 can be cyclones. The j-leg 255 can include a non-mechanical "j-valve," "L-valve," or other valve to increase the effective solids residence time, increase the carbon conversion, and minimize aeration requirements for recycling solids to the mixing zone 215. One or more particulate transfer devices 245, such as one or more loop seals, can be located downstream of the disengagers 230, 240 to collect the separated particulates.

The raw syngas in line 106 exiting the gasifier 205 can include, but is not limited to, hydrogen, carbon monoxide, carbon dioxide, methane, nitrogen, argon, or any combination thereof. The raw syngas in line 106 can have a hydrogen content ranging from a low of about 40 mol % to a high of about 80 mol %. The raw syngas in line 106 can have a carbon monoxide content ranging from a low of about 15 mol % to a high of about 25 mol %. The raw syngas in line 106 can have a carbon dioxide content ranging from a low of about 0 mol % to about 40 mol %. The raw syngas in line 106 can be have a methane content ranging from a low of about 0 mol %, about 5 mol %, or about 10 mol % to a high of about 20 mol %, about 30 mol %, or about 40 mol %. For example, the raw syngas in line 106 can have a methane content ranging from a low of about 3.5 mol %, about 4 mol %, about 4.5 mol %, or about 5 mol % to a high of about 8 mol %, about 8.5 mol %, about 9 mol %, or about 9.5 mol % or more. The raw syngas in line 106 can have a nitrogen content ranging from a low of about 0 mol %, about 1 mol %, or about 2 mol % to a high of about 3 mol %, about 6 mol %, or about 10 mol %. When air or excess air is introduced as an oxidant via line 104 to the gasifier 205, the nitrogen content in raw syngas in line 106 can range from about 10 mol % to about 50 mol % or more. When an essentially nitrogen-free oxidant is introduced via line 104 to the gasifier 205, the nitrogen content in the raw syngas in line 106 can range from about 0 mol % to about 4 mol %. The raw syngas in line 106 can have an argon content ranging from a low of about 0 mol %, about 0.5 mol %, or about 1 mol % to a high of about 1.5 mol %, about 2 mol %, or about 3 mol %. An essentially nitrogen-free oxidant introduced via line 104 can provide raw syngas via line 106 having a combined nitrogen and argon concentration ranging from a low of about 0.001 mol % to a high of about 3 mol %.

The syngas cooler 305 can include one or more heat exchangers or heat exchanging zones. As illustrated, the syngas cooler 305 can include three heat exchangers 310, 320, and 330 arranged in series. Any one or all of the heat exchangers 310, 320, 330 can be shell-and-tube type heat exchangers. The raw syngas via line 106 can be cooled in the first heat exchanger ("first zone") 310 to provide a cooled raw syngas via line 315 having a temperature of from about 260° C. to about 820° C. The cooled raw syngas exiting the first heat exchanger 310 via line 315 can be further cooled in the second heat exchanger ("second zone") 320 to provide a cooled raw syngas via line 325 having a temperature of from about 260° C. to about 704° C. The cooled raw syngas exiting the second heat exchanger 320 via line 325 can be further cooled in the third heat exchanger ("third zone") 330 to provide a cooled raw syngas via line 116 having a temperature of from about 260° C. to about 430° C. Although not shown, the syngas cooler 305 can be or include a single boiler.

The heat transfer medium (e.g., boiler feed water) via line 108 can be heated within the third heat exchanger ("economizer") 330 to provide the cooled syngas via line 116 and a condensate via line 338. The condensate 338 can be introduced ("flashed") to one or more steam drums or separators 340 to separate the gas phase ("steam") from the liquid phase ("condensate"). The condensate via line 346 from the separator 340 can be introduced to the first heat exchanger ("boiler") 310 and indirectly heated against the syngas introduced via line 106 to provide at least partially vaporized steam which can be introduced to the separator 340 via line 344. Steam via line 342 can be introduced to the second heat exchanger ("superheater") 320 and heated against the incoming syngas via line 315 to provide the superheated steam or superheated high pressure steam via line 114.

The superheated steam or superheated high pressure steam via line 114 can have a temperature of about 400° C. or more, about 450° C. or more, about 500° C. or more, about 550° C. or more, about 600° C. or more, about 650° C. or more, about 700° C. or more, or about 750° C. or more. The superheated steam or superheated high pressure steam via line 114 can have a pressure of about 4,000 kPa or more, about 8,000 kPa or more, about 11,000 kPa or more, about 15,000 kPa or more, about 17,000 kPa or more, about 19,000 kPa or more, about 21,000 kPa or more, or about 22,100 kPa or more. The steam via line 114 can be used to drive one or more steam turbines 360 that, in turn, drive one or more electric generators 380. The steam turbine 360 can provide a condensate via line 390 that can be introduced back into the syngas cooler 305. For example, the condensate via line 390 can be introduced to the economizer 330.

The cooled raw syngas via line 116 can exit the syngas cooler 305 and be introduced to the syngas purification system 400. The treated syngas via line 118 and the heat transfer medium, (e.g., boiler feed water) via line 120 can be introduced to the methanator 500 to provide the SNG via line 122 and the heated heat transfer medium or steam via line 124. At least a portion of the steam in line 124 can be introduced back into the syngas cooler 305 via line 112. For example, the steam via line 112 can be introduced to the boiler 310, the superheater 320, the economizer 330, and/or the separator 340.

Figure 3:
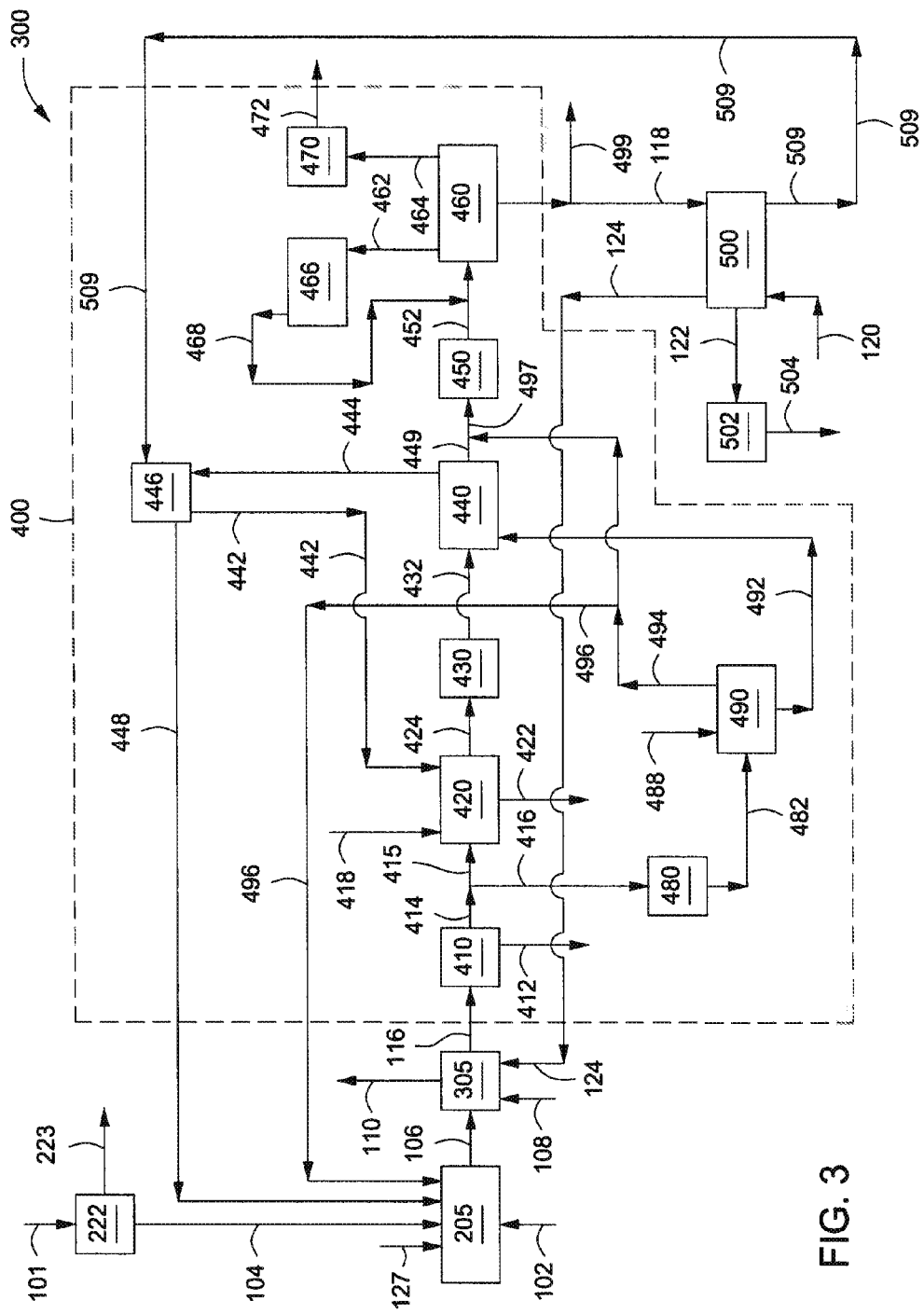
FIG. 3 depicts a schematic of another illustrative SNG system, according to one or more embodiments described.

FIG. 3 depicts a schematic of another illustrative SNG system 300, according to one or more embodiments. Air can be introduced to an air separation unit 222 via line 101 to provide nitrogen via line 223 and the oxidant via line 104. The air separation unit 222 can be a high-pressure, cryogenic-type separator. The separated nitrogen via line 223 can be used in the SNG generation system 300. For example, the nitrogen via line 223 can be introduced to a combustion turbine (not shown).

The oxidant via line 104, the feedstock via line 102, and the steam via line 127 can be introduced to the gasifier 205 to provide the raw syngas via line 106. The oxidant via line 104 can be pure oxygen, nearly pure oxygen, essentially oxygen, or oxygen-enriched air. Further, the oxidant via line 104 can be a nitrogen-lean, oxygen-rich feed, thereby minimizing the nitrogen concentration in the syngas provided via line 106 to the syngas cooler 305. The use of a pure or nearly pure oxygen feed allows the gasifier 205 to produce a syngas that can be essentially nitrogen-free, e.g., containing less than 0.5 mol % nitrogen/argon. The air separation unit 222 can provide from about 10%, about 30%, about 50%, about 70%, about 90%, or about 100% of the total oxidant introduced to the gasifier 205.

The air separation unit 222 can supply the oxidant via line 104 at a pressure ranging from about 2,000 kPa to 10,000 kPa or more. For example, the air separation unit 222 can supply oxidant of about 99.5% purity at a pressure of about 1,000 kPa greater than the pressure within the gasifier 205. The flow of oxidant can be controlled to limit the amount of carbon combustion that takes place within the gasifier 205 and to maintain the temperature within the gasifier 205. The oxidant can enter the gasifier 205 at a ratio (weight of oxygen to weight of feedstock on a dry and mineral matter free basis) ranging from about 0.1:1 to about 1.2:1. For example, the ratio of oxidant to the feedstock can be about 0.66:1 to about 0.75:1.

As discussed and described above with reference to FIGS. 1 and 2, the raw syngas can be introduced to the syngas cooler 305 via line 106. The syngas in line 106 can be cooled by the syngas cooler 305, and the cooled syngas via line 116 can be introduced to the syngas purification system 400. The syngas purification system 400 can include one or more particulate control devices 410, one or more saturators 420, one or more gas shift devices 430, one or more gas coolers 440, one or more flash gas separators 446, one or more mercury removal devices 450, one or more acid gas removal devices 460, one or more sulfur recovery units 466, one or more carbon handling compression units 470, one or more COS hydrolysis devices 480, and/or one or more ammonia scrubbing devices 490.

The cooled syngas can be introduced via line 116 to the particulate control device 410. The particulate control device 410 can include one or more separation devices, such as high temperature particulate filters. The particulate control device 410 can provide a filtered syngas with a particulate concentration below the detectable limit of about 0.1 ppmw. An illustrative particulate control device can include, but is not limited to, sintered metal filters (for example, iron aluminide filter material), metal filter candles, and/or ceramic filter candles. The particulate control device 410 can eliminate the need for a water scrubber due to the efficacy of removing particulates from the syngas. The elimination of a water scrubber can allow for the elimination of dirty water or grey water systems, which can reduce the process water consumption and associated waste water discharge.

The solid particulates can be purged from the system via line 412, or they can be recycled to the gasifier 205 (not shown). The filtered syngas via line 414 leaving the particulate control device 410 can be divided, and at least a portion of the syngas can be introduced to the saturator 420 via line 415, and another portion can introduced to the carbonyl sulfide ("COS") hydrolysis device 480 via line 416. Heat can be recovered from the cooled syngas in line 416. For example, the cooled syngas in line 416 can be exposed to a heat exchanger or a series of heat exchangers (not shown). The portions of cooled syngas introduced to the saturator 420 via line 415 and to the COS hydrolysis device 480 via line 416 can be based, at least in part, on the desired ratio of hydrogen to carbon monoxide and/or carbon dioxide at the inlet of the methanation device 500. Although not shown, in one or more embodiments the filtered syngas via line 414 can be introduced serially to both the saturator 420 and the COS hydrolysis device 480.

The saturator 420 can be used to increase the moisture content of the filtered syngas in line 415 before the syngas is introduced to the gas shift device 430 via line 424. Process condensate generated by other devices in the SNG system 300 can be introduced via line 442 to the saturator 420. Illustrative condensates can include process condensate from the ammonia scrubber 490, process condensate from the syngas cooler 305, process condensate from the gas cooler 440, process condensate from methanator 500, or a combination thereof. Make-up water, such as demineralized water, can also be supplied via line 418 to the saturator 420 to maintain a proper water balance.

The saturator 420 can have a heat requirement, and about 70 percent to 75 percent of the heat requirement can be sensible heat provided by the cooled syngas in line 415, as well as medium to low grade heat available from other portions of the SNG system 300. About 25 percent to 30 percent of the heat requirement can be supplied by indirect steam reboiling. The indirect steam reboiling can use medium pressure steam. For example, the steam can have a pressure ranging from about 4,000 kPa to about 4,580 kPa. In one or more embodiments, the saturator 420 does not have a live steam addition. The absence of live steam addition to the saturator

420 can minimize the overall required water make-up and reduce saturator blow down via line 422.

Saturated syngas can be introduced via line 424 to the gas shift device 430. The gas shift device 430 can include a system of parallel single-stage or two-stage gas shift catalytic beds. The saturated syngas in line 424 can be preheated before entering the gas shift device 430. For example, the temperature of the saturated syngas in line 424 can range from about 200° C. to about 295° C., from about 190° C. to about 290° C., or from about 290° C. to about 300° C. or more. The saturated syngas can enter the gas shift device 430 with a steam-to-dry gas molar ratio ranging from about 0.8:1 to about 1.2:1 or higher. The saturated syngas in line 424 can include carbonyl sulfide, which can be at least partially hydrolyzed to hydrogen sulfide by the gas shift device 430.

The gas shift device 430 can be used to convert the saturated syngas to provide a shifted syngas via line 432. The gas shift device 430 can include one or more shift converters to adjust the hydrogen to carbon monoxide ratio of the syngas by converting carbon monoxide to carbon dioxide. The gas shift device 430 can include, but is not limited to, single stage adiabatic fixed bed reactors, multiple-stage adiabatic fixed bed reactors with interstage cooling, steam generation or cold quench reactors, tubular fixed bed reactors with steam generation or cooling, fluidized bed reactors, or any combination thereof.

A cobalt-molybdenum catalyst can be incorporated into the gas shift device 430. The cobalt-molybdenum catalyst can operate at a temperature of about 290° C. in the presence of hydrogen sulfide, such as about 100 ppmw hydrogen sulfide. If the cobalt-molybdenum catalyst is used to perform a sour shift, subsequent downstream removal of sulfur can be accomplished using any sulfur removal method and/or technique.

The gas shift device 430 can include two reactors arranged in series. A first reactor can be operated at high temperature of from about 260° C. to about 400° C. to convert a majority of the carbon monoxide present in the saturated syngas in line 424 to carbon dioxide at a relatively high reaction rate using a catalyst which can be, but is not limited to, copper-zinc-aluminum, iron oxide, zinc ferrite, magnetite, chromium oxides, derivatives thereof, or any combination thereof. A second reactor can be operated at a relatively low temperature of about 150° C. to about 200° C. to maximize the conversion of carbon monoxide to carbon dioxide and hydrogen. The second reactor can use a catalyst that includes, but is not limited to, copper, zinc, copper promoted chromium, derivatives thereof, or any combination thereof. The gas shift device 430 can recover heat from the shifted syngas. The recovered heat can be used to preheat the saturated syngas in line 424 before it enters the gas shift device 430. The recovered heat can also pre-heat feed gas to the shift reactors, pre-heat recycled condensate, preheat make-up water introduced to the SNG system 300, produce medium pressure steam, provide at least a portion of the heat duty for the syngas saturator 420, provide at least a portion of the heat duty for the acid gas removal device 460, and/or provide at least a portion of the heat to dry the carbonaceous feedstock and/or other systems within the SNG system 300.

After the saturated syngas is shifted forming a shifted syngas, the shifted syngas can be introduced via line 432 to the gas cooler 440. The gas cooler 440 can be an indirect heat exchanger. The gas cooler 440 can recover at least a portion of heat from the shifted syngas in line 432 and produce cooled shift converted syngas and a condensate. The cooled shift converted syngas can leave the gas cooler 440 via line 449.

The condensate from the gas cooler 440 can be introduced via line 442 to the saturator 420 after passing through the flash gas separator 446.

The COS hydrolysis device 480 can convert carbonyl sulfide in the cooled syngas in line 416 to hydrogen sulfide. The COS hydrolysis device 480 can include a number of parallel carbonyl sulfide reactors. For example, the COS hydrolysis device 480 can have about two or more, three or more, four or more, five or more, or ten or more parallel carbonyl sulfide reactors. The filtered syngas in line 416 can enter the COS hydrolysis device 480, pass over the parallel carbonyl sulfide reactors, and hydrogen sulfide syngas can exit the COS hydrolysis device 480 via line 482. The hydrogen sulfide syngas in line 482 can have a carbonyl sulfide concentration of about 1 ppmv or less. The heat in the hydrogen sulfide syngas in line 482 can be recovered and used to preheat boiler feedwater, to dry the carbonaceous feedstock, as a heat source in other portions of the SNG system 300, or any combination thereof. A heat exchanger (not shown) can be used to recover the heat from the hydrogen sulfide syngas in line 482. Illustrative heat exchangers can include a shell and tube heat exchanger, a concentric flow heat exchanger, or any other heat exchanging device. After the heat is recovered from the hydrogen sulfide syngas in line 482, the hydrogen sulfide syngas in line 482 can be introduced to the ammonia scrubbing device 490.

The ammonia scrubbing device 490 can use water introduced via line 488 to remove ammonia from the hydrogen sulfide syngas in line 482. The water via line 488 can be recycle water from other parts of the SNG generation system 300 or can be make-up water supplied from an external source. The water supplied to the ammonia scrubber 490 via line 488 can also include water produced during the drying of the carbonaceous feedstock. The water via line 488 can be provided at a temperature ranging from about 50° C. to about 64° C. For example, the water can have a temperature of about 54° C. The water can remove at least a portion of any fluorides and/or chlorides in the syngas. Accordingly, waste water having ammonia, fluorides, and/or chlorides can be discharged from the ammonia scrubber 490 and introduced via line 492 to the gas cooler 440 where it can be combined with the condensate to provide a combined condensate. The combined condensate can be provided via line 444 to the flash gas separator 446. The combined condensate in line 444 can be pre-heated before entering the flash gas separator 446. The combined condensate in line 444 can have a pressure ranging from about 2,548 kPa to about 5,922 kPa. The combined condensate in line 444 can be flashed in the flash gas separator 446 to provide a flashed gas and a condensate. The flashed gas can include ammonia. The flashed gas can be recycled back to the gasifier 205 via line 448 and converted therein to nitrogen and hydrogen. The condensate can be recycled to the saturator 420 via line 442.

The ammonia scrubbing device 490 can also output a scrubbed syngas via line 494. A portion of the scrubbed syngas in line 494 can be recycled back to the gasifier 205 via line 496. Another portion of the scrubbed syngas in line 494 can be combined with the cooled shifted syngas in line 449 to provide a mixed syngas via line 497. The mixed syngas in line 497 can be pre-heated and introduced to the mercury removal device 450. The mixed syngas in line 497 can have a temperature ranging from about 60° C. to about 71° C., about 20° C. to 80° C., or about 60° C. to about 90° C.

The mercury removal device 450 can include, but is not limited to, activated carbon beds that can adsorb a substantial amount, if not all, of the mercury present in the processed syngas. The processed syngas recovered from the mercury removal device 450 via line 452 can be introduced to the acid gas removal device 460.

The acid gas removal device 460 can remove carbon dioxide from the processed syngas. The acid gas removal device 460 can include, but is not limited to, a physical solvent-based two stage acid gas removal system. The physical solvents can include, but are not limited to, Selexol™ (dimethyl ethers of polyethylene glycol) Rectisol™ (cold methanol), or combinations thereof. One or more amine solvents such as methyl-diethanolamine (MDEA) can be used to remove at least a portion of any acid gas, e.g., carbon dioxide, from the processed syngas to provide the treated syngas via line 118. The treated syngas can be introduced via line 118 to the methanator 500. The treated syngas in line 118 can have a carbon dioxide content from a low of about 0 mol % to a high of about 40 mol %. The treated syngas in line 118 can have a total sulfur content of about 0.1 ppmv or less.

The carbon dioxide can be recovered as a low-pressure carbon dioxide rich stream via line 464. The carbon dioxide content in line 464 can be about 95 mol % carbon dioxide or more. The low-pressure carbon dioxide stream can have a hydrogen sulfide content of less than 20 ppmv. The low-pressure carbon dioxide stream can be introduced via line 464 to the carbon handling compression unit 470. The low-pressure carbon dioxide stream in line 464 can be exposed to one or more compression trains, and the carbon dioxide can leave the carbon handling compression unit 470 via line 472 as a dense-phase fluid at a pressure ranging from about 13,890 kPa to about 22,165 kPa. The carbon dioxide via line 472 can be used for enhanced oil recovery, or it can be sequestered. In one or more embodiments, the carbon dioxide stream in line 472 can conform to carbon dioxide pipeline specifications. The carbon handling compression unit 470 can be a four stage compressor or any other compressor. An illustrative compressor can include a four stage intercooled centrifugal compressor with electric drives.

The acid gas removal device 460 can also remove sulfur from the processed gas. The sulfur can be concentrated as a hydrogen sulfide rich stream. The hydrogen sulfide rich stream can be introduced via line 462 to the sulfur recovery unit 466 for sulfur recovery. As an example, the sulfur recovery unit 466 can be an oxygen fired Claus unit. When the hydrogen sulfide stream in line 462 is combusted in the sulfur recovery unit 466, a tail gas can be produced. The tail gas can be compressed and recycled via line 468 upstream of the acid gas removal device 460.

A portion of the treated gas in line 118 can be removed via line 499 and used as a fuel gas. The fuel gas can be combusted to provide power for the SNG system 300. The remaining treated syngas in line 118 can be introduced to the methanator 500. The treated syngas can have a nitrogen content of 0 mol % to about 50 mol % and an argon content ranging from about 0 mol % to about 5 mol %.

The heat transfer medium via line 120 can be introduced to the methanator 500, as discussed and described above with reference to FIGS. 1 and 2. The methanator 500 can provide the SNG via line 122, the heated heat transfer medium via line 124, and a methanation condensate via line 509. The methanation condensate can be recycled back to the flash gas separator 446 via line 509, and the methanation condensate can be flashed with the combined condensate in the flash gas separator 446 to provide at least a portion of the condensate in line 442.

In one or more embodiments, the methanation condensate in line 509 can be recycled back to the gas cooler 440, saturator 420, or other portions of the SNG system 300. The methanator 500 can also provide high pressure steam via line 124 to the syngas cooler 305. The syngas cooler 305 can superheat the high pressure steam to provide superheated high pressure steam via line 110, as discussed and described above. The superheated high pressure steam can be introduced to one or more steam turbine generators to produce electricity for the SNG system 300.

The methanator 500 can include one, two, three, four, five, six, or more methanator reactors. For example, the methanator 500 can include three reactors arranged in parallel and a fourth reactor can be in series with three parallel reactors (not shown). The three parallel reactors can provide a portion of the total SNG introduced to the fourth reactor. The three reactors can also have a recycle stream, which can recycle a portion of the SNG back to the inlet of each of the three reactors. SNG can be provided from the fourth reactor via line 122 to the SNG drying and compression device 502.

The methanator 500 can also include various heat exchangers and mixing equipment to ensure that a proper temperature is maintained in each of the methanator reactors. The reactors can include a methanation catalyst such as nickel, ruthenium, another common methanation catalyst material, or combinations thereof. The methanator 500 can be maintained at a temperature from about 150° C. to about 1,000° C. The methanator 500 can provide SNG via line 122 to the SNG drying and compression device 502.

The SNG drying and compression device 502 can dehydrate the SNG in line 122 to about 3.5 kilograms of water per million standard cubic meters (Mscm) or lower. The dehydration can be performed in a conventional tri-ethylene glycol unit. After dehydration the SNG in line 122 can be compressed, cooled, and introduced via line 504 to an end user or a pipeline. The SNG in line 504 can have a pressure ranging from about 1,379 kPa to about 12,411 kPa and a temperature of about 20° C. to about 75° C. In one or more embodiments, the SNG in line 122 can be compressed, and after compression the SNG in line 122 can be dehydrated.

Figure 4:
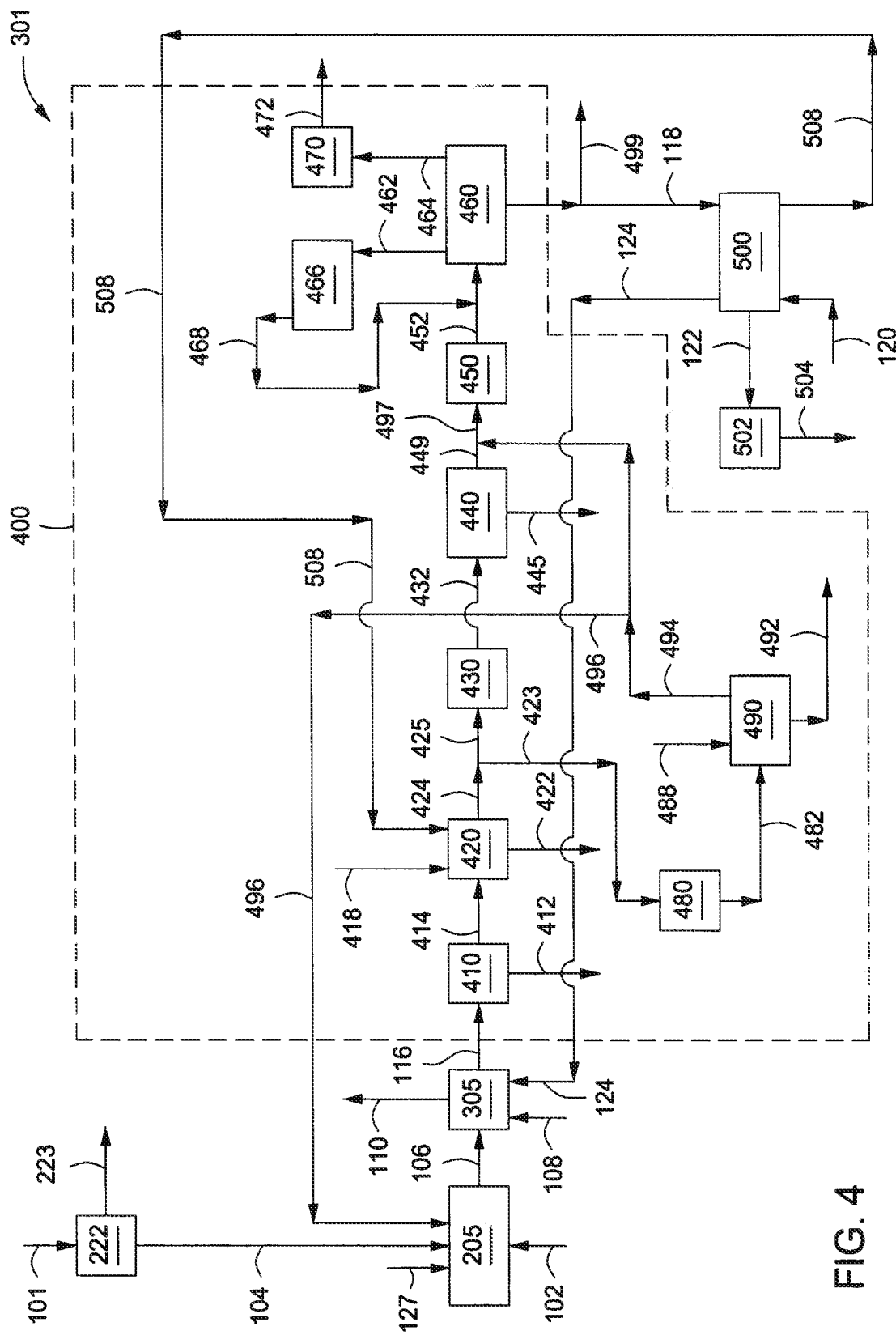
FIG. 4 depicts a schematic of another illustrative SNG system, according to one or more embodiments described.

FIG. 4 depicts a schematic of another illustrative SNG system 301, according to one or more embodiments. The SNG system 301 is similar to the SNG system 300, and like numerals are used to indicate like elements. As shown in FIG. 4, the syngas via line 424 can be divided, and at least a portion of the syngas can be introduced to the gas shift device 430 via line 425, and another portion can be introduced to the COS hydrolysis device 480 via line 423. The COS hydrolysis device 480 can convert carbonyl sulfide in the syngas in line 423 to hydrogen sulfide. The COS hydrolysis device 480 can include one or more carbonyl sulfide reactors. For example, the COS hydrolysis device 480 can include a plurality of parallel carbonyl sulfide reactors (not shown). For example, the COS hydrolysis device 480 can include two, three, four, five, or ten or more parallel carbonyl sulfide reactors. The saturated syngas in line 423 can enter the COS hydrolysis device 480, pass through the one or more carbonyl sulfide reactors, and hydrogen sulfide syngas can exit the COS hydrolysis device 480 via line 482. The hydrogen sulfide syngas in line 482 can have a carbonyl sulfide concentration of about 1 ppmv or less. At least a portion of the heat in the hydrogen sulfide syngas in line 482 can be recovered and used to preheat boiler feedwater, to dry the carbonaceous feedstock, as a heat source in other portions of the SNG system 301, or any combination thereof. A heat exchanger (not shown) can be used to recover heat from the hydrogen sulfide syngas in line 482. Illustrative heat exchangers can include a shell and tube heat exchanger, a concentric flow heat exchanger, or any other heat exchanging device. After the heat is recovered from the hydrogen sulfide syngas in line 482, the hydrogen sulfide syngas in line 482 can be introduced to the ammonia scrubbing device 490.

Water via line 488 can be introduced to the ammonia scrubbing device 490 to remove at least a portion of any ammonia from the hydrogen sulfide syngas in line 482. The water via line 488 can be recycle water from other locations of the SNG generation system 301 and/or can be supplied from an external source. The water supplied to the ammonia scrubber 490 via line 488 can also include water produced during the drying of the carbonaceous feedstock. The water in line 488 can be at a temperature ranging from about 50° C. to about 64° C. For example, the water can have a temperature of about 54° C. The water can remove at least a portion of any fluorides and/or chlorides in the syngas. Accordingly, waste water having ammonia, fluorides, and/or chlorides can be discharged from the ammonia scrubber 490 via line 492. The waste water in line 492 can be recycled to other parts of the SNG system 301, or it can be removed from the SNG system 301.

Further, the flash gas separator 446 (see FIG. 3) can be removed from the SNG system 301. As such, the methanation condensate from the methanator 500 can be recycled to the saturator 420 via line 508. The methanation condensate via line 508 can include, but is not limited to, water, carbon monoxide, carbon dioxide, hydrogen, methane, nitrogen, argon, hydrogen sulfide, COS, and ethane, or any mixture or combination thereof. For example, the methanation condensate in line 508 can have a water content ranging from a low of about 75 mol %, about 80 mol %, about 85 mol %, or about 90 mol % to a high of about 95 mol %, about 97 mol %, about 99 mol %, about 99.9 mol %, about 99.95 mol %, or about 100 mol %. The methanation condensate via line 508 can be introduced to the saturator 420 to increase the moisture content of the cooled syngas in line 414. The gas cooler 440 can also discharge a condensate via line 445. The condensate via line 445 can be introduced to the saturator 420, to other parts of the SNG system 301, or be removed from the SNG system 301.

The methanation condensate in line 508 can have a carbon monoxide content ranging from a low of 0 mol %, about 0.1 mol %, or about 0.5 mol % to a high of about 1 mol %, about 2 mol %, or about 5 mol %. The methanation condensate in line 508 can have a carbon dioxide content ranging from a low of 0 mol %, about 0.1 mol %, or about 0.5 mol % to a high of about 1 mol %, about 2 mol %, or about 5 mol %. The methanation condensate in line 508 can have a hydrogen content ranging from a low of 0 mol %, about 0.01 mol %, or about 0.1 mol % to a high of about 0.5 mol %, about 1 mol %, or about 2 mol %. The methanation condensate in line 508 can have a methane content ranging from a low of 0 mol %, about 0.01 mol %, or about 0.1 mol % to a high of about 0.5 mol %, about 1 mol %, or about 2 mol %. The methanation condensate in line 508 can also have a nitrogen content ranging from a low of 0 mol %, about 0.001 mol %, or about 0.01 mol % to a high of about 0.05 mol %, about 0.1 mol %, or about 0.5 mol % and an argon content ranging from a low of 0 mol %, about 0.001 mol %, or about 0.01 mol % to a high of about 0.05 mol %, about 0.1 mol %, or about 0.5 mol %. The methanation condensate in line 508 can further have a hydrogen sulfide content ranging from a low of 0 mol %, about 0.001 mol %, or about 0.01 mol % to a high of about 0.05 mol %, about 0.1 mol %, or about 0.2 mol %, a COS content ranging from a low of 0 mol %, about 0.001 mol %, or about 0.01 mol % to a high of about 0.05 mol %, about 0.1 mol %, or about 0.2 mol %, and an ethane content ranging from a low of 0 mol %, about 0.001 mol %, or about 0.01 mol % to a high of about 0.05 mol %, about 0.1 mol %, or about 0.5 mol %.

The methanation condensate in line 508 can be at a temperature ranging from a low of about 0° C. to a high of about 200° C. For example, the methanation condensate in line 508 can be at a temperature of about 1° C. to about 150° C., about 5° C. to about 100° C., about 15° C. to about 75° C., about 20° C. to about 60° C., or about 30° C. to about 50° C. when introduced to the saturator 420.

The methanation condensate in line 508 can be at a pressure ranging from a low of about 500 kPa to a high of about 15,000 kPa. For example, the methanation condensate in line 508 can be at a pressure of about 1,000 kPa to about 12,000 kPa, about 2,000 kPa to about 10,000 kPa, or about 4,000 kPa to about 8,000 kPa when introduced to the saturator 420.

The temperature of the saturated syngas in line 424 exiting the saturator 420 can range from about 200° C. to about 295° C., from about 190° C. to about 290° C., or from about 290° C. to about 300° C. or more. The saturated syngas in line 424 can have a steam-to-dry gas molar ratio ranging from about 0.8:1 to about 1.2:1 or higher. The saturated syngas in line 424 can include carbonyl sulfide, which can be at least partially hydrolyzed to hydrogen sulfide by the gas shift device 430.

PROPHETIC EXAMPLES

In order to provide a better understanding of the foregoing discussion, the following non-limiting prophetic examples are offered. Although the prophetic examples may be directed to specific embodiments, they are not to be viewed as limiting the invention in any specific respect. All parts, proportions, and percentages are by weight unless otherwise indicated.

Example I

One or more of the above described systems can theoretically be used with Wyoming Powder River Basin ("WPRB") coal. The WPRB coal was given a composition as shown in Table 1 below.

TABLE 1

| Coal Component | WPRB wt % |
|---|---|
| C | 51.75 |
| O | 11.52 |
| H | 3.41 |
| N | 0.71 |
| S | 0.26 |
| Cl | 0.01 |
| F | 0.00 |
| Moisture | 27.21 |
| Ash | 5.13 |
| HHV, kJ/kg | 20,385 |

The simulated composition of the raw syngas via line 106 from the gasifier 205 was calculated to have a composition as shown in Table 2.

TABLE 2

| | Raw syngas via line 106 |
|---|---|
| Temperature | 927° C. |
| Pressure | 3600 kPa |
| Component | mol % (wet basis) |
| CO | 39.7 |
| $H_2$ | 28.5 |
| $CO_2$ | 14.3 |
| $CH_4$ | 4.3 |

TABLE 2-continued

| | Raw syngas via line 106 |
|---|---|
| $NH_3$ | 0.4 |
| $H_2O$ | 12.6 |
| $N_2$ | 0.09 |
| Ar | 0.08 |
| $H_2S$ | 750 ppmv |
| HCN | 250 ppmv |
| COS | 40 ppmv |
| HF | 18 ppmv |
| HCl | 30 ppmv |

Based on simulated process conditions, when the syngas provided from the gasification of the WPRB coal is processed in accordance to one or more embodiments discussed and described above, the treated syngas via line 118 introduced to the methanator 500 can have the composition shown in Table 3.

TABLE 3

| | Treated syngas via line 118 |
|---|---|
| Temperature | 27° C. |
| Pressure | 2,758 kPa |
| Component | mol % (dry basis) |
| CO | 22.89 |
| $H_2$ | 70.68 |
| $CO_2$ | 0.50 |
| $CH_4$ | 5.70 |
| $N_2$ | 0.12 |
| Ar | 0.10 |
| $H_2S$ + COS | <0.1 ppmv |

The calculated feed requirements and some of the byproduct production for generating SNG from WPRB coal using a process according to one or more of the embodiments discussed and described above can be as shown in Table 4. The feed requirements and byproduct (carbon dioxide) generation were calculated using the assumption of a production of about 4.3 million standard cubic meters per day (Mscmd) of SNG with a heating value of about 36 MJ/scm.

TABLE 4

| | Coal feed rate, tonne/day | | Oxygen tonne/tonne | Make-up water, | Fuel Gas | | $CO_2$, |
|---|---|---|---|---|---|---|---|
| Coal | AR | AF | coal | CMPM | Mscmd | MJ/scm (HHV) | tonne/day |
| WPRB | 13,213 | 11,713 | 0.75 | 1.14 | 1.89 | 13.4 | 14,911 |

AR is the calculated coal feed rate in tonnes per day as received, which has a moisture content for WPRB coal of 27.21 wt %. AF is the calculated coal feed rate as the coal is introduced to the gasifier 205, which has a moisture content for PRB coal of 17.89 wt %. The oxygen per tonne of coal was calculated on moisture and ash free basis. The calculated make-up water for the SNG system, which uses syngas derived from WPRB coal, is about 1.14 cubic meters per minute (CMPM). Fuel gas is treated syngas, in excess of the treated syngas needed to meet the target SNG production of 4.3 Mscmd, which can be used as fuel for the SNG system 300. In addition to the byproduct carbon dioxide listed in Table 4, other byproducts produced using WPRB coal were calculated to include sulfur at a rate of about 33 tonne/day and ash at a rate of about 814 tonne/day.

Example II

One or more of the above described systems theoretically can be used with North Dakota Lignite Coal. The North Dakota Lignite Coal was given a composition as shown below in Table 5 below.

TABLE 5

| Coal Component | North Dakota Lignite wt % |
|---|---|
| C | 44.21 |
| O | 12.45 |
| H | 2.71 |
| N | 0.68 |
| S | 0.60 |
| Cl | 0.01 |
| F | 0.00 |
| Moisture | 29.82 |
| Ash | 9.53 |
| HHV, kJ/kg | 17,058 |

The simulated composition of the raw syngas via line 106 from the gasifier 205 was calculated to have a composition as shown in Table 6.

TABLE 6

| | Raw syngas via line 106 |
|---|---|
| Temperature | 899° C. |
| Pressure | 3,600 kPa |
| Component | mol % (wet basis) |
| CO | 35.6 |
| $H_2$ | 25.6 |
| $CO_2$ | 17.5 |
| $CH_4$ | 6.1 |
| $NH_3$ | 0.4 |
| $H_2O$ | 14.4 |
| $N_2$ | 0.09 |
| Ar | 0.07 |
| $H_2S$ | 2,007 ppmv |
| HCN | 274 ppmv |

TABLE 6-continued

| | Raw syngas via line 106 |
|---|---|
| COS | 106 ppmv |
| HF | Nil |
| HCl | 15 ppmv |

Based on simulated process conditions, when the raw syngas via line 106 from the gasification of the North Dakota Lignite is processed in accordance to one or more embodiments discussed and described above, the treated syngas via line 118 introduced the methanator 500 can have the composition shown in Table 7.

TABLE 7

| | Treated syngas via line 118 |
|---|---|
| Temperature | 27° C. |
| Pressure | 2,758 kPa |
| Component | mol % (dry basis) |
| CO | 22.14 |
| $H_2$ | 68.41 |
| $CO_2$ | 0.50 |
| $CH_4$ | 8.71 |
| $N_2$ | 0.14 |
| Ar | 0.11 |
| $H_2S$ + COS | <0.1 ppmv |

The calculated feed requirements and some of the byproducts produced during the production of the SNG from North Dakota Lignite Coal can be as shown in Table 8. The values in Table 8 were based on the use of three gasifiers 205. The feed requirements and byproduct generation were calculated assuming a production of about 4.3 Mscmd of SNG with a heating value of about 36 MJ/scm.

TABLE 8

| | Coal feed rate, tonne/day | | Oxygen tonne/tonne | Make-up water, | Fuel Gas | | $CO_2$, |
|---|---|---|---|---|---|---|---|
| Coal | AR | AF | coal | CMPM | Mscfd | MJ/scm (HHV) | tonne/day |
| North Dakota Lignite | 14,030 | 11,976 | 0.66 | .267 | 0 | n/a | 13,545 |

AR is the calculated coal feed rate in tonnes per day as received, which had moisture content for the North Dakota lignite of 29.82 wt %. AF is the calculated coal feed rate as the coal is introduced to the gasifier 205, which had a moisture content for the North Dakota Lignite of 17.89 wt %. The oxygen per tonne of coal is calculated on a moisture and ash free basis. The calculated make-up water for the SNG system, which uses syngas derived from the North Dakota Lignite, is about 0.267 CMPM. In addition to the byproduct (carbon dioxide) listed in Table 8, other byproducts produced using North Dakota lignite were calculated to include sulfur at a rate of about 79 tonne/day and ash at a rate of about 1,521 tonne/day.

Simulated Auxiliary Power Requirements

The following section discusses the SNG facility's auxiliary power load requirements, power generation concepts, and options to meet the balance of power demand. The outside battery limit ("OSBL") steam and power systems include the steam generation system and the electric power generation system. The inside battery limit ("ISBL") process units produce substantial amounts of steam from waste heat recovery, which can be used to make electric power in one or more steam turbine generators ("STGs"). The specific configuration can depend on decisions regarding the electric power balance. For example, if sufficient electric power is reliably available at a competitive price from the local utility grid, the balance of the power demand can be purchased. However, if sufficient electric power is not reliably available, the SNG facility can be operated, electrically, in "island mode" and can generate all electrical power on-site. The island mode is possible with the SNG system because the SNG system is more efficient than other SNG systems. The basic design options considered include:

a) Base Case—Purchase the balance of power requirements from the grid.
b) Option 1—Island operation with the balance of power provided via fired boilers and larger STGs.
c) Option 2—Island operation with the balance of power provided primarily via gas turbine generators (GTGs), heat recovery steam generators (HRSGs), and larger STGs.

Tables 9 and 10 summarize the basic performance parameters for the steam and power generation systems for the WPRB and North Dakota lignite cases.

WPRB Case Description

For the simulated WPRB coal case, there is a surplus of syngas (fuel gas) produced based on a target SNG production rate of 4.3 Mscmd. In the Base Case option, this surplus syngas is used as boiler fuel to produce more electric power via the STGs, and the balance of the electric power can be purchased off-site. In Options 1 & 2, the balance of power is generated on-site. With a fixed amount of syngas produced from the gasifiers, using syngas as fuel can reduce the net production of SNG in Option 1, as indicated. In Option 2, a small surplus of syngas is available after meeting the power generation requirements (i.e., Table 9 shows slightly more power generation than load for Option 2). This is due to the higher efficiency of Option 2 vs. Option 1. The excess syngas can be used to increase SNG production marginally, or the cogen cycle can be de-tuned to keep the syngas requirement in balance. For example, the load on one or more GTGs can be reduced and duct firing for one or more HRSGs can be increased.

TABLE 9

Table 9: Power Consumption & Generation Summary [WPRB (4.3 Mscmd SNG, plus Fuel Gas)]

| | | Case | | |
|---|---|---|---|---|
| Power Balance Description | | BASE purchase power | OPTION 1 fire boiler and use larger STGs | OPTION 2 GTG + HRSG cogen |
| Electric Load Summary | MW | | | |
| ISBL | | 111.9 | 111.9 | 111.9 |
| ASU | | 132.6 | 132.6 | 132.6 |
| CO2 Compression | | 66.3 | 66.3 | 66.3 |
| OSBL Misc. | | 23.9 | 25.5 | 21.1 |
| Total | | 334.7 | 336.3 | 331.9 |
| Electrical Supply Summary | MW | | | |
| STGs | | 293.1 | 336.3 | 258.8 |
| GTGs | | n/a | n/a | 74.2 |
| Outside Purchase | | 241.6 | n/a | −1.1 |
| Total | | 334.7 | 336.3 | 331.9 |

TABLE 9-continued

Table 9: Power Consumption & Generation Summary [WPRB (4.3 Mscmd SNG, plus Fuel Gas)]

| Power Balance Description | | BASE purchase power | OPTION 1 fire boiler and use larger STGs | OPTION 2 GTG + HRSG cogen |
|---|---|---|---|---|
| Fuel to Steam/ Power Gen | GJ/hr HHV | | | |
| Package Boilers | | n/a | 1620 | n/a |
| GTGs | | n/a | n/a | 891 |
| HRSGs | | n/a | n/a | 121 |
| Total Consumption | GJ/hr HHV | 0 | 1620 | 1056 |
| Surplus Syngas Available | GJ/hr HHV | 1056 | 1056 | 1056 |
| Other Syngas Fuel | | n/a | 564 | 0 |
| Total Syngas to Fuel | | 1056 | 1620 | 1056 |
| SNG Production Reduction | Mscmd | 0 | 0.2808 | 0 |

North Dakota Lignite Case Description

For the North Dakota lignite case, in the Base Case option, the balance of electric power is purchased from off-site. In Options 1 & 2, the balance of power is generated on-site. Since no additional fuel gas is available, the extra fuel requirement for Options 1 & 2 is shown as an equivalent reduction in SNG production.

TABLE 10

Table 10: Power Consumption & Generation Summary - North Dakota lignite (4.3 Mscmd SNG)

| Power Balance Description | | BASE purchase power | OPTION 1 fire boiler and use larger STGs | OPTION 2 GTG + HRSG cogen |
|---|---|---|---|---|
| Electric Load Summary | MW | | | |
| ISBL | | 105.3 | 105.3 | 105.3 |
| ASU | | 110.3 | 110.3 | 110.3 |
| CO2 Compression | | 60 | 60 | 60 |
| OSBL Misc. | | 17.4 | 23.5 | 18.8 |
| Total | | 292.9 | 299.1 | 294.4 |
| Electrical Supply Summary | MW | | | |
| STGs | | 184.8 | 299.1 | 220.1 |
| GTGs | | n/a | n/a | 74.2 |
| Outside Purchase | | 108.1 | n/a | n/a |
| Total | | 292.9 | 299.1 | 294.4 |
| Fuel to Steam/ Power Gen | GJ/hr HHV | | | |
| Package Boilers | | n/a | 1428 | n/a |
| GTGs | | n/a | n/a | 932 |
| HRSGs | | n/a | n/a | unfired |
| Total Consumption | GJ/hr HHV | 0 | 1428 | 932 |
| Surplus Syngas Available | GJ/hr HHV | n/a | n/a | n/a |
| Other Syngas Fuel | | n/a | 1428 | 932 |
| Total Syngas to Fuel | | 0 | 1428 | 932 |
| SNG Production Reduction | Mscmd | 0 | 0.789 | 0.515 |

Embodiments described herein further relate to any one or more of the following paragraphs:

1. A method for producing a synthetic gas, comprising: gasifying a carbonaceous feedstock in the presence of an oxidant within a gasifier to provide a raw syngas; cooling the raw syngas within a cooler to provide a cooled syngas; processing the cooled syngas within a purification system to provide a treated syngas, wherein the purification system comprises a saturator adapted to increase a moisture content of the cooled syngas; introducing the treated syngas and a first heat transfer medium to a methanator to provide a synthetic gas, a second heat transfer medium, and a methanation condensate; and recycling at least a portion of the methanation condensate from the methanator to the saturator.

2. The method of paragraph 1, further comprising transferring heat from the raw syngas to at least a portion of the second heat transfer medium within the cooler to provide a third heat transfer medium.

3. The method of paragraph 2, wherein the third heat transfer medium is a superheated high pressure steam.

4. The method according to any one of paragraphs 1 to 3, wherein the methanation condensate comprises about 0.01 mol % to about 1 mol % carbon monoxide, about 0.001 mol % to about 0.5 mol % hydrogen, about 0.01 mol % to about 1 mol % carbon dioxide, about 0.001 mol % to about 0.5 mol % methane, and about 0.001 mol % to about 0.2 mol % nitrogen.

5. The method according to any one of paragraphs 1 to 4, wherein the saturator provides a saturated syngas, and further comprising introducing at least a portion of the saturated syngas to a hydrolysis device to provide a hydrogen sulfide syngas.

6. A method for producing a synthetic gas, comprising: gasifying a feedstock in the presence of an oxidant within a gasifier to provide a raw syngas; cooling the raw syngas within a cooler to provide a cooled syngas; processing the cooled syngas within a purification system to provide a treated syngas; introducing the treated syngas and a first heat transfer medium to a methanator to provide a synthetic gas, a second heat transfer medium, and a methanation condensate; and transferring heat from the raw syngas to at least a portion of the second heat transfer medium within the cooler to provide a third heat transfer medium.

7. The method of paragraph 6, wherein the methanation condensate comprises about 0.01 mol % to about 1 mol % carbon monoxide, about 0.001 mol % to about 0.5 mol % hydrogen, about 0.01 mol % to about 1 mol % carbon dioxide, about 0.001 mol % to about 0.5 mol % methane, and about 0.001 mol % to about 0.2 mol % nitrogen.

8. The method of paragraph 6 or 7, further comprising removing particulates from the cooled syngas with a particulate control device within the purification system to provide a filtered syngas.

9. The method of paragraph 8, further comprising increasing a moisture content of the filtered syngas with a saturator to provide a saturated syngas.

10. The method of paragraph 9, further comprising recycling at least a portion of the methanation condensate from the methanator to the saturator.

11. The method of paragraph 9, further comprising introducing at least a portion of the saturated syngas to a gas shift device to provide a shifted syngas.

12. The method of paragraph 11, further comprising: introducing at least a portion of the saturated syngas to a hydrolysis device to provide a hydrogen sulfide syngas; and removing ammonia from the hydrogen sulfide syngas with an ammonia scrubber to provide a scrubbed syngas.

13. The method of paragraph 12, further comprising introducing the shifted syngas and at least a portion of the scrubbed syngas to an acid gas removal device to provide the treated syngas.

14. The method of paragraph 12, further comprising recycling at least a portion of the scrubbed syngas to the gasifier.

15. A system for producing a synthetic gas, comprising: a gasifier adapted to gasify a feedstock in the presence of an oxidant to provide a raw syngas; a cooler coupled to the gasifier and adapted to cool the raw syngas to provide a cooled syngas; a purification system coupled to the cooler and adapted to convert the cooled syngas into a treated syngas, wherein the purification system comprises a saturator adapted to increase a moisture content of the cooled syngas; and a methanator coupled to the purification system and adapted to receive the treated syngas and a first heat transfer medium and to provide a synthetic gas, a second heat transfer medium, and a methanation condensate, wherein at least a portion of the methanation condensate is recycled to the saturator.

16. The system of paragraph 15, wherein the purification system further comprises a particulate control device coupled to the cooler and adapted to remove particulates from the cooled syngas and to provide a filtered syngas to the saturator.

17. The system of paragraph 15, further comprising a gas shift device coupled to the saturator and adapted to receive at least a portion of a saturated syngas from the saturator and to provide a shifted syngas.

18. The system of paragraph 17, further comprising a hydrolysis device coupled to the saturator and adapted to receive at least a portion the saturated syngas from the saturator and to provide a hydrogen sulfide syngas; and an ammonia scrubber coupled to the hydrolysis device and adapted to receive the hydrogen sulfide syngas and to provide a scrubbed syngas.

19. The system of paragraph 18, further comprising an acid gas removal device adapted to receive the shifted syngas and at least a portion of the scrubbed syngas and to provide the treated syngas to the methanator.

20. The system according to any one of paragraphs 15 to 19, wherein heat from the raw syngas is transferred to at least a portion of the second heat transfer medium within the cooler to provide a third heat transfer medium, and further comprising: a steam turbine coupled to the cooler and adapted to receive the third heat transfer medium; and an electric generator coupled to and driven by the steam turbine.

Certain embodiments and features have been described using a set of numerical upper limits and a set of numerical lower limits. It should be appreciated that ranges from any lower limit to any upper limit are contemplated unless otherwise indicated. Certain lower limits, upper limits and ranges appear in one or more claims below. All numerical values are "about" or "approximately" the indicated value, and take into account numerical error and variations that would be expected by a person having ordinary skill in the art.

Various terms have been defined above. To the extent a term used in a claim is not defined above, it should be given the broadest definition persons in the pertinent art have given that term as reflected in at least one printed publication or issued patent. Furthermore, all patents, test procedures, and other documents cited in this application are fully incorporated by reference to the extent such disclosure is not inconsistent with this application and for all jurisdictions in which such incorporation is permitted.

While the foregoing is directed to embodiments of the present invention, other and further embodiments of the invention may be devised without departing from the basic scope thereof, and the scope thereof is determined by the claims that follow.

What is claimed is:

1. A method for producing a synthetic gas, comprising:
   gasifying a carbonaceous feedstock in the presence of an oxidant within a gasifier to provide a raw syngas;
   cooling the raw syngas within a cooler having distinct first second, and third zones for heat exchange, wherein the raw syngas is cooled within the first zone to provide a first cooled syngas;
   exchanging heat within the second zone from the first cooled syngas to a first steam and a second heat transfer medium to provide a second cooled syngas and a second steam comprising superheated high pressure steam;
   exchanging heat within the third zone from the second cooled syngas to a boiler feed water to provide a third cooled syngas and a feed water condensate;
   processing the third cooled syngas within a purification system to provide a treated syngas, wherein the purification system comprises a saturator adapted to increase a moisture content of the third cooled syngas;
   introducing the treated syngas and a first heat transfer medium to a methanator to provide a synthetic gas, the second heat transfer medium, and a methanation condensate; and
   recycling at least a portion of the methanation condensate from the methanator to the saturator.

2. The method of claim 1, wherein the superheated high pressure steam has a temperature of about 450° C. to about 750° C. and a pressure of about 4,000 kPa to about 22,100 kPa.

3. The method of claim 1, wherein gasifying the carbonaceous feedstock in the presence of the oxidant occurs in a fluidized reaction zone operated at a temperature of about 816° C. to about 1,066° C.

4. The method of claim 1, wherein the methanation condensate comprises about 0.01 mol % to about 1 mol % carbon monoxide, about 0.001 mol % to about 0.5 mol % hydrogen, about 0.01 mol % to about 1 mol % carbon dioxide, about 0.001 mol % to about 0.5 mol % methane, and about 0.001 mol % to about 0.2 mol % nitrogen, and wherein the raw syngas comprises about 40 mol % to about 80 mol % hydrogen, up to about 10 mol % nitrogen, up to about 3 mol % argon, about 15 mol % to about 25 mol % carbon monoxide, and up to about 40 mol % carbon dioxide.

5. The method of claim 1, wherein the saturator provides a saturated syngas, and further comprising introducing at least a portion of the saturated syngas to a hydrolysis device to provide a hydrogen sulfide syngas.

6. A method for producing a synthetic gas, comprising:
gasifying a feedstock in the presence of an oxidant within a gasifier to provide a raw syngas;
cooling the raw syngas within a cooler having distinct first, second, and third zones for heat exchange, wherein the raw syngas is cooled within the first zone to provide a first cooled syngas;
exchanging heat within the second zone from the first cooled syngas to a first steam and a second heat transfer medium to provide a second cooled syngas and a second steam comprising superheated high pressure steam at a temperature of about 450° C. to about 750° C. and a pressure of about 4,000 kPa to about 22,100 kPa;
exchanging heat within the third zone from the second cooled syngas to a boiler feed water to provide a third cooled syngas and a feed water condensate;
processing the third cooled syngas within a purification system to provide a treated syngas, wherein the purification system comprises a saturator adapted to increase a moisture content of the cooled syngas;
introducing the treated syngas and a first heat transfer medium to a methanator to provide a synthetic gas, a second heat transfer medium, and a methanation condensate; and
recycling at least a portion of the methanation condensate from the methanator to the saturator.

7. The method of claim 6, wherein the methanation condensate comprises about 0.01 mol % to about 1 mol % carbon monoxide, about 0.001 mol % to about 0.5 mol % hydrogen, about 0.01 mol % to about 1 mol % carbon dioxide, about 0.001 mol % to about 0.5 mol % methane, and about 0.001 mol % to about 0.2 mol % nitrogen.

8. The method of claim 6, further comprising removing particulates from the third cooled syngas with a particulate control device within the purification system to provide a filtered syngas.

9. The method of claim 8, wherein the saturator adapted to increase a moisture content of the third cooled syngas provides a saturated syngas.

10. The method of claim 9, further comprising recycling at least a portion of the methanation condensate from the methanator to the saturator, wherein the superheated high pressure steam has a temperature of about 650° C. to about 750° C. and a pressure of about 11,000 kPa to about 22,100 kPa.

11. The method of claim 9, further comprising introducing at least a portion of the saturated syngas to a gas shift device to provide a shifted syngas.

12. The method of claim 11, further comprising:
introducing at least a portion of the saturated syngas to a hydrolysis device to provide a hydrogen sulfide syngas; and
removing ammonia from the hydrogen sulfide syngas with an ammonia scrubber to provide a scrubbed syngas.

13. The method of claim 12, further comprising introducing the shifted syngas and at least a portion of the scrubbed syngas to an acid gas removal device to provide the treated syngas.

14. The method of claim 12, further comprising recycling at least a portion of the scrubbed syngas to the gasifier.

15. A method for producing a synthetic gas, comprising:
gasifying a feedstock in the presence of an oxidant within a gasifier to provide a raw syngas;
cooling the raw syngas within a cooler having distinct first, second, and third zones for heat exchange, wherein the raw syngas is cooled within the first zone to provide a first cooled syngas;
exchanging heat within the second zone from the first cooled syngas to a first steam and a second heat transfer medium to provide a second cooled syngas and a second steam comprising superheated high pressure steam, wherein the superheated high pressure steam has a temperature of about 450° C. to about 750° C. and a pressure of about 4,000 kPa to about 22,100 kPa;
exchanging heat within the third zone from the second cooled syngas to a boiler feed water to provide a third cooled syngas and a feed water condensate;
processing the third cooled syngas within a purification system to provide a treated syngas, wherein the purification system comprises a saturator adapted to increase a moisture content of the third cooled syngas to provide a saturated syngas;
introducing the treated syngas and a first heat transfer medium to a methanator to provide a synthetic gas, the second heat transfer medium, and a methanation condensate;
introducing at least a portion of the saturated syngas to a hydrolysis device to provide a hydrogen sulfide syngas;
recycling at least a portion of the methanation condensate from the methanator to the saturator;
introducing at least a portion of the saturated syngas to a gas shift device to provide a shifted syngas;
removing ammonia from the hydrogen sulfide syngas with an ammonia scrubber to provide a scrubbed syngas; and
introducing the shifted syngas and at least a portion of the scrubbed syngas to an acid gas removal device to provide the treated syngas.

16. The method of claim 15, further comprising recycling at least a portion of the scrubbed syngas to the gasifier.

17. The method of claim 15, further comprising removing particulates from the third cooled syngas with a particulate control device within the purification system to provide a filtered syngas.

18. The method of claim 15, further comprising recycling at least a portion of the methanation condensate from the methanator to the saturator, wherein the superheated high pressure steam has a temperature of about 650° C. to about 750° C. and a pressure of about 11,000 kPa to about 22,100 kPa.

19. The method of claim 18, wherein the methanation condensate comprises about 0.01 mol % to about 1 mol % carbon monoxide, about 0.001 mol % to about 0.5 mol % hydrogen, about 0.01 mol % to about 1 mol % carbon dioxide, about 0.001 mol % to about 0.5 mol % methane, and about 0.001 mol % to about 0.2 mol % nitrogen.

* * * * *